(12) United States Patent
Aikens et al.

(10) Patent No.: US 9,039,817 B2
(45) Date of Patent: May 26, 2015

(54) MULTILAYERED MIXED BED FILTER FOR THE REMOVAL OF TOXIC GASES FROM AIR STREAMS AND METHODS THEREOF

(71) Applicants: Scott Technologies, Inc., Boca Raton, FL (US); Nanoscale Materials, Inc., Manhattan, KS (US)

(72) Inventors: Christopher L. Aikens, Manhattan, KS (US); Olga B. Koper, Dublin, OH (US); Slawomir Winecki, Dublin, OH (US); Amy Elizabeth Quiring, Matthews, NC (US); Maciej Stanislaw Matyjaszczyk, Monroe, NC (US); Martin Keller, Indian Trail, NC (US)

(*) Notice: Subject to any disclaimer, the term of this patent is extended or adjusted under 35 U.S.C. 154(b) by 0 days.

(21) Appl. No.: 13/945,019

(22) Filed: Jul. 18, 2013

(65) Prior Publication Data

US 2013/0302231 A1 Nov. 14, 2013

Related U.S. Application Data

(63) Continuation of application No. PCT/US2012/021948, filed on Jan. 20, 2012.

(60) Provisional application No. 61/434,752, filed on Jan. 20, 2011.

(51) Int. Cl.
*B01D 53/02* (2006.01)
*B01J 20/04* (2006.01)
(Continued)

(52) U.S. Cl.
CPC .............. *B01D 53/02* (2013.01); *B01J 20/041* (2013.01); *B01J 20/06* (2013.01); *B01J 20/20* (2013.01); *B01J 20/28007* (2013.01); *B01J 20/3204* (2013.01); *B01J 20/3246* (2013.01); *B01J 20/3248* (2013.01); *B01D 2251/402* (2013.01);

(Continued)

(58) Field of Classification Search
CPC .................. B01D 2251/402; B01D 2251/404; B01D 2253/102; B01D 2253/1122; B01D 2257/93; B01D 2258/06; B01D 2259/4145; B01D 53/02; B01J 20/041; B01J 20/06; B01J 20/20; B01J 20/28007; B01J 20/28052; B01J 20/3204; B01J 20/3246; B01J 20/3248; B01J 2220/42; B92Y 30/00
See application file for complete search history.

(56) References Cited

U.S. PATENT DOCUMENTS

| 5,944,878 A | 8/1999 | Lindhe |
| 6,093,236 A | 7/2000 | Klabunde et al. |

(Continued)

FOREIGN PATENT DOCUMENTS

WO    WO 2008055126 A2 *  5/2008 ............. B01D 53/02

*Primary Examiner* — Christopher P Jones
(74) *Attorney, Agent, or Firm* — Wyatt B. Pratt (57) ABSTRACT

To achieve the removal of a broad spectrum of chemical hazards, multiple layers of impregnated activated carbon and nanocrystalline materials are incorporated into the adsorbent bed. For optimum performance using the least amount of material, a two-layer configuration is used. The top layer consists of a homogeneous mixture of an MgO/CaO based nanocrystalline material (e.g., Mg/Ca) and Kureha or other petroleum pitch-based bead shaped activated carbon impregnated treated with phosphoric acid. The bottom layer is comprised of a single layer of Calgon URC carbon. The volume ratios of the components are 9:5:11 Mg/Ca, phosphoric acid treated Kureha carbon, and URC, respectively. The new configuration leads to a 30% reduction in size of the existing NIOSH CBRN CAP 1 cartridge. Other embodiments are disclosed and claimed.

16 Claims, 9 Drawing Sheets

(51) Int. Cl.
  *B01J 20/06*    (2006.01)
  *B01J 20/20*    (2006.01)
  *B01J 20/28*    (2006.01)
  *B01J 20/32*    (2006.01)
  *B82Y 30/00*    (2011.01)

(52) U.S. Cl.
  CPC ..... *B01D 2251/404* (2013.01); *B01D 2253/102* (2013.01); *B01D 2253/1122* (2013.01); *B01D 2257/93* (2013.01); *B01D 2258/06* (2013.01); *B01D 2259/4145* (2013.01); *B01J 2220/42* (2013.01); *B01J 20/28052* (2013.01); *B82Y 30/00* (2013.01)

(56) References Cited

U.S. PATENT DOCUMENTS

| | | |
|---|---|---|
| 6,344,071 B1 | 2/2002 | Smith et al. |
| 2003/0153457 A1 | 8/2003 | Nemoto et al. |
| 2008/0156734 A1 | 7/2008 | Burba et al. |
| 2008/0286179 A1 | 11/2008 | Liu et al. |
| 2009/0215618 A1 | 8/2009 | Fansler et al. |
| 2010/0047142 A1 | 2/2010 | Wood et al. |

\* cited by examiner

MULTILAYERED MIXED BED FILTER FOR THE REMOVAL OF TOXIC GASES FROM AIR STREAMS AND METHODS THEREOF

CROSS-REFERENCE TO RELATED APPLICATIONS

This application is a continuation of International Patent Application No. PCT/US2012/021948 filed Jan. 20, 2012, which claims the benefit of U.S. Provisional Patent Application No. 61/434,752 filed Jan. 20, 2011, the contents of both of which are incorporated by reference herein.

FIELD OF THE DISCLOSURE

The invention relates generally to improvements in the removal of toxic gases from air streams, and more particularly to a multilayered mixed bed filter for removing toxic gases for air streams in air purification systems.

BACKGROUND OF THE DISCLOSURE

The ability to filter specific contaminants from an air stream is particularly useful in air-purifying respirators for individual protection and collective protection air filtration scrubbers. Additionally, reduction in the size of the adsorbent bed is important in reducing physiological burden of the users and improving integration of personal protective equipment including filters in operational environments. By reducing the size of the adsorbent bed, the overall size of the air-purification canister or cartridge can also be reduced. In an air-purifying respirator with mask-mounted filtration element, this reduction in size moves the center of mass of the canister closer to the user's face, reducing the moment of inertia, and increasing user comfort and reducing wearer fatigue. Additionally, a given size of filter may be maintained while increasing the gas capacity of the filter, which provides longer wear times due to time to breakthrough associated with contaminants removed for that size or capacity of filter.

Typically, adsorbents used in canisters are high surface area materials such as activated carbons or zeolites. Carbons readily adsorb many organic species from an air stream; however their limited activity toward high vapor pressure species such as acid gases and ammonia makes removal difficult. To overcome these limitations, the carbon can be impregnated with reactive chemicals specifically targeted to certain agents. There is a balance which must be maintained to improve reactivity of the carbon while maintaining the high surface area required for adsorption. Too high of an impregnation amount will decrease the activity of the carbon. This means that to remove greater amounts of agent, larger amounts of activated carbon are required to maintain sufficient bed residence times for the agent. Current applications overcome this in one of two ways: either a broad spectrum carbon is used, such as Calgon Carbon's Universal Respirator Carbon or URC, in a large, single bed, or multiple layers of activated carbon or impregnated alumina are used, each targeting a specific class of agents.

High surface area materials (carbon, alumina, zeolites) are commonly used for air filtration because they can remove many contaminants. The ability of these materials to remove certain chemicals greatly depends on the chemical composition of the adsorbent, surface area, and pore size. The removal also depends on the chemical and physical properties of the contaminant. These properties determine whether a contaminant is physisorbed or chemisorbed. Physisorbed contaminants are usually only weakly bound and can be released with changes in temperature, gas stream composition, or other conditions. Chemisorbed materials undergo a chemical reaction on the adsorbent surface and are thus converted to a different material. Activated carbons, while containing very high surface areas, are insufficient to adsorb low boiling point compounds such as ammonia, thus some type of impregnant is required to react and trap the contaminant. Impregnation of any support involves a balance of loading a sufficient amount of the reactive impregnant without destroying the high surface area of the support. Some types of metal oxides have shown the capability to adsorb ammonia, but high surface area materials are necessary to adsorb any significant amount.

It would be desirable to provide an improved filter media arrangement for an air purification canister or cartridge that meets current performance requirements and minimizes the overall size of the adsorbent bed. The desired arrangement would reduce the overall size of the canister or cartridge or would allow increased filter gas capacity while maintaining current canister/cartridge size.

SUMMARY OF THE DISCLOSURE

The ability to filter specific contaminants from an air stream has uses in many areas including air-purifying respirators for individual protection and collective protection air filtration scrubbers. The disclosed arrangement meets the performance requirements of the NIOSH Chemical, Biological, Radiological and Nuclear (CBRN) Air-Purifying Respirator CAP 1 standard while minimizing the overall size of the adsorbent bed, and/or by increasing the capacity to meet NIOSH CAP 2 or greater requirements. By reducing the size of the adsorbent bed, the overall size of the canister or cartridge can be reduced. In an air-purifying respirator with mask-mounted filtration element, this reduction in size moves the center of mass of the canister closer to the user's face, reducing the moment of inertia, and increasing user comfort and reducing wearer fatigue. Additionally, a given size of the filter may be maintained while increasing the gas capacity of the filter, which provides longer wear times due to time to breakthrough associated with contaminants removed for that size or capacity of filter.

A filter medium is disclosed, comprising a first plurality of filter media particles, comprised of a high surface area substrate comprising at least one acidic impregnant, a second plurality of filter media particles, comprised of a high surface are substrate comprising at least one metal oxide and a third plurality of filter media particles, comprised of high surface area substrate containing an amine impregnant.

A filter medium is disclosed having a first plurality of filter media particles of phosphoric acid, with a surface area of 500 square meters per gram or more, the second plurality of filter media particles of an agglomeration of the oxides of magnesium and oxides of calcium, with a surface area of about 100 square meters per gram or more, and a third plurality of filter media particles of triethylenediamine (TEDA) having a surface area of about 700 meters per gram or more.

A filter medium is disclosed having a first plurality of filter media particles of phosphoric acid, with a surface area of 770 square meters per gram or more, the second plurality of filter media particles of an agglomeration of the oxides of magnesium and oxides of calcium, with a surface area of about 196 square meters per gram or more, and a third plurality of filter media particles of TEDA having a surface area of about 700 meters per gram or more.

A filter medium is disclosed having a first plurality of filter media particles comprising a high surface area substrate comprising at least one acidic impregnant, a second plurality of filter media particles comprising a high surface area substrate comprising at least one metal oxide, and a third plurality of filter media particles comprising a high surface area substrate containing an amine impregnant. Each of the substrates may be essentially free of chromium. The filter medium may comprise first and second filter media layers, where the first and second plurality of filter media are intermixed and are located in the first filter layer, and the third plurality of filter media particles is located in the second filter layer. In some embodiments, the acidic impregnant can be phosphoric acid. In other embodiments, the acidic impregnant can have a maximum concentration of 10 percent. The metal oxide may be selected from the list consisting of oxides of magnesium, oxides of calcium, and combinations thereof. The metal oxide may be an agglomeration of oxides of magnesium and oxides of calcium. In some embodiments, the metal oxide may comprise a nano-crystalline structure of about 20 nanometers or less per individual crystallite. In other embodiments, the metal oxide may comprise a nano-crystalline metal oxide structure average of about 20 nanometers or less per individual crystallite. The amine impregnant may include a diamine. The diamine may comprise an aliphatic linear carbon chain. The diamine may have a molecular weight of from about 100 or more. The diamine may have a boiling point of about 80 degrees Celsius or higher. The amine impregnant may include triethylenediamine (TEDA).

In some embodiments, the first plurality of filter media particles may comprise phosphoric acid having a surface area of about 500 square meters per gram or more, the second plurality of filter media particles may comprise an agglomeration of oxides of magnesium and oxides of calcium having a surface area of about 100 square meters per gram or more, and the third plurality of filter media particles may comprise triethylenediamine (TEDA) having a surface area of about 700 meters per gram or more. The phosphoric acid may have a surface area of 770 square meters per gram or more and the agglomeration of the oxides of magnesium and the oxides of calcium have a surface area of about 196 square meters per gram or more.

A method for purifying an airstream is also disclosed. The method may include passing air through a filter media comprising a first plurality of filter media particles comprising a high surface area substrate comprising at least one acidic impregnant, a second plurality of filter media particles comprising a high surface area substrate comprising at least one metal oxide, and a third plurality of filter media particles comprising a high surface area substrate containing an amine impregnant. Each of the substrates may be essentially free of chromium. In some embodiments, the filter media may comprise first and second filter media layers, where the first and second plurality of filter media are intermixed and are located in the first filter layer, and the third plurality of filter media particles is located in the second filter layer. In some embodiments, the acidic impregnant may be phosphoric acid, and the metal oxide may be selected from the list consisting of oxides of magnesium, oxides of calcium, and combinations thereof. In other embodiments, the first plurality of filter media particles can comprise phosphoric acid having a surface area of about 500 square meters per gram or more, the second plurality of filter media particles can comprise an agglomeration of oxides of magnesium and oxides of calcium having a surface area of about 100 square meters per gram or more, and the third plurality of filter media particles can comprise triethylenediamine (TEDA) having a surface area of about 700 meters per gram or more.

BRIEF DESCRIPTION OF THE DRAWINGS

By way of example, a specific embodiment of the disclosed device will now be described, with reference to the accompanying drawings.

DETAILED DESCRIPTION

The disclosure describes a filter, a filter medium, and a method of manufacture and use thereof, having a first plurality of filter media particles, comprised of a high surface area substrate comprising at least one acidic impregnant, a second plurality of filter media particles, comprised of a high surface area substrate comprising at least one metal oxide and a third plurality of filter media particles, comprised of high surface area substrate containing an amine impregnant. In one embodiment, each substrate is essentially free of chromium.

In some embodiments, the filter media has first and second filter media layers, with the first and second plurality of filter media intermixed and located in the first filter layer, and the third plurality of filter media particles located in the second filter layer. In some embodiments, the acidic impregnant is phosphoric acid and/or has a maximum concentration of 10 percent. The metal oxide may be an oxide of magnesium, an oxide of calcium, or a combination thereof. Particularly preferred are metal oxides that are agglomerations of the oxides of magnesium and oxides of calcium. The metal oxide may comprise a nano-crystalline structure, with such sizes as having an average of from about 20 nanometers or less per individual crystallite.

The amine impregnant may be a diamine, which in one exemplary embodiment includes aliphatic linear carbon chains, such as those diamines having a molecular weight of from about 100 or more. Additionally, the boiling point of the diamine may be from about 80 degrees Celsius or more. In one embodiment, the amine impregnant of the invention is triethylenediamine (TEDA).

Figure 1:
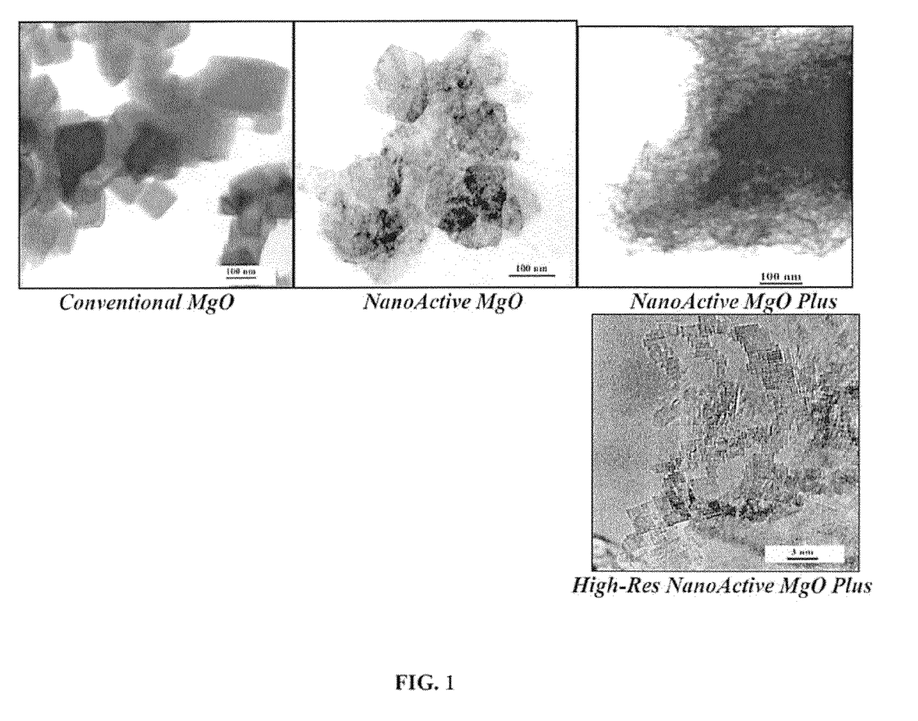
FIG. 1 shows a Transmission Electron Microscopy (TEM) image of magnesium oxides with the scale bar of top row micrographs is 100 nm, and the scale bar of the bottom row micrograph is 3 nm.

NanoScale Corporation's NanoActive® (NA) nanocrystalline metal oxides have large numbers of edge and corner defect sites, much higher surface area, and much higher chemical reactivity than their bulk counterparts. FIG. 1 shows a comparison of conventional MgO and two nanomaterials, NanoActive® MgO and NanoActive® MgO Plus. Specifically, FIG. 1 shows a Transmission Electron Microscopy (TEM) image of Magnesium Oxides. The scale bar of top row micrographs is 100 nm, while the scale bar of the bottom row micrograph is 3 nm.

The conventional sample consists of ~100 nanometer (nm) cubes with low porosity. NanoActive® MgO is composed of hexagonal platelets, 80 nm long and 10 nm thick, which create a porous web-like material. The high resolution TEM of NanoActive® MgO Plus shows very small 2-4 nm cubes that aggregate into interconnected polyhedral structures, forming a highly porous material with numerous low-coordinate corners and edge sites.

Figure 2:
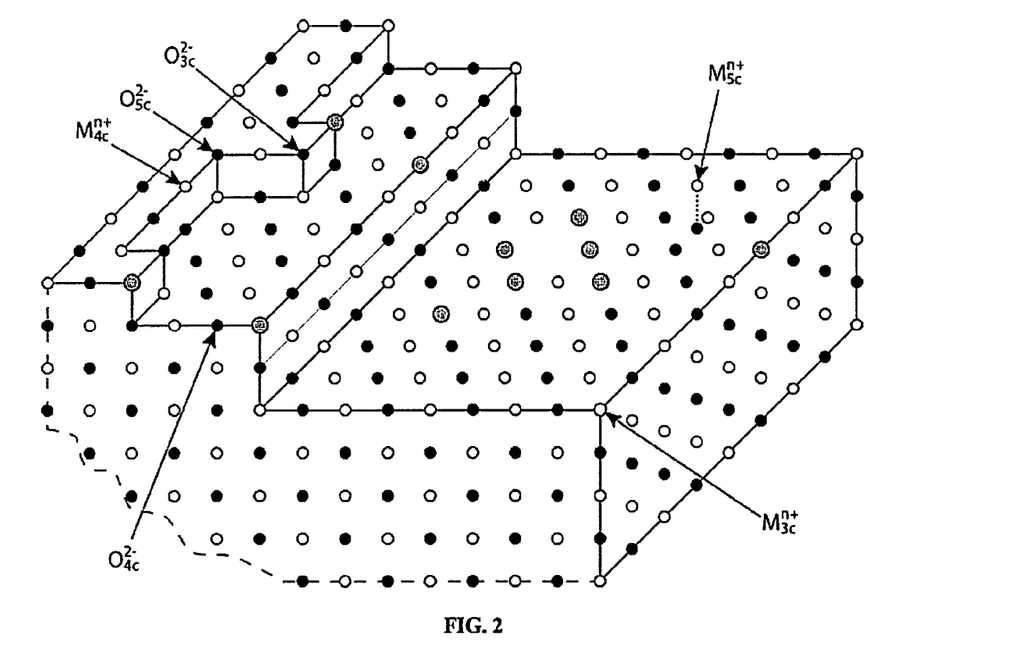
FIG. 2 is a conceptual diagram of a reactive metal oxide crystal, showing many different coordinated unsaturated sites, and vacancy sites.

A conceptual view of a defective metal oxide crystal is shown in FIG. 2. As can be seen, the reactive metal oxide crystal includes many different coordinatively unsaturated sites, as well as vacancy sites.

Cation ($M^{2+}$) sites in the interior of the crystal (not visible) have a coordination number of 6, surface cations have a coordination number of 5, edge cations have a coordination number of 4, and corner sites have a coordination number of 3. A surface vacancy defect reduces the coordination number of surrounding ions. In general, the lower the coordination number of a cation site, the higher its reactivity.

Figure 3:
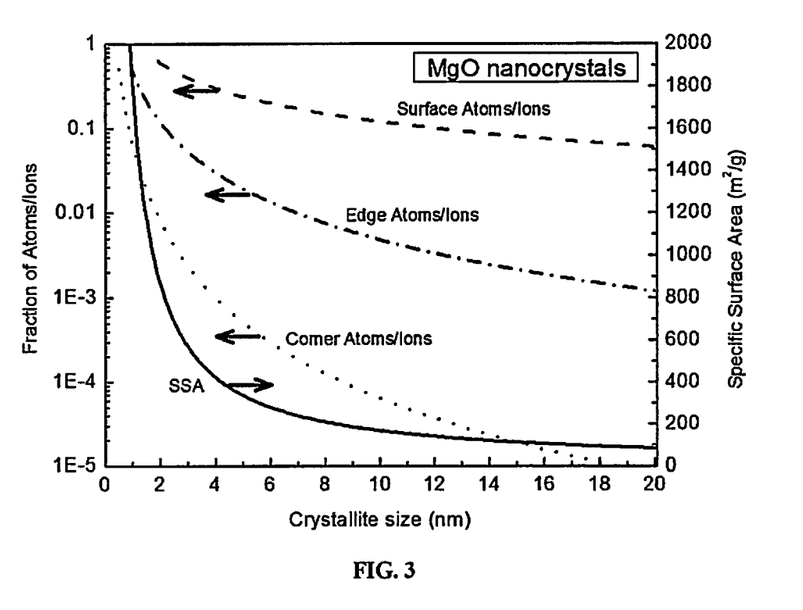
FIG. 3 is a graph showing Specific Surface Area (SSA) and fractions of surface, edge, and corner atoms/ions for MgO nano-crystals of different sizes.

FIG. 3 shows Specific Surface Area (SSA) and fractions of surface, edge, and corner atoms/ions for MgO nanocrystals of different sizes based on simple theoretical calculations for cubic crystals. Theoretically, nanocrystalline materials with crystal size of 2 nm have a specific surface area exceeding 1000 $m^2/g$, 50% of surface ions, 10% of edge ions, and 1% of corner ions. Although real nanocrystalline materials contain somewhat smaller fractions of active sites due to crystal agglomeration, their chemical reactivity is exceptionally high.

Such morphology results in enhanced chemical reactivity and suggests a two-step decomposition mechanism on nanoparticles (first step being adsorption of a toxic chemical or agent on the surface by means of physisorption, followed by a second step—chemical decomposition). This two-step mechanism substantially enhances detoxification abilities of nanoparticles because it makes the decomposition less dependent on the rate of chemical reaction. The rate of chemical reaction depends on the chemical or agent-nanoparticle combination. For some agents, therefore, the rate may be quite low. In addition, the reaction rate strongly decreases at lower temperatures. Because of these reasons, any detoxification method that relies only on chemical reactivity would not work for many toxic agents and would not be effective at low temperatures. Reactive nanoparticles do not have this drawback because surface adsorption remains active even at very low temperatures (in fact, physisorption is enhanced at low temperatures) and because all potential toxic agents are subject to physisorption (which would then be followed by destructive adsorption).

Figure 4:
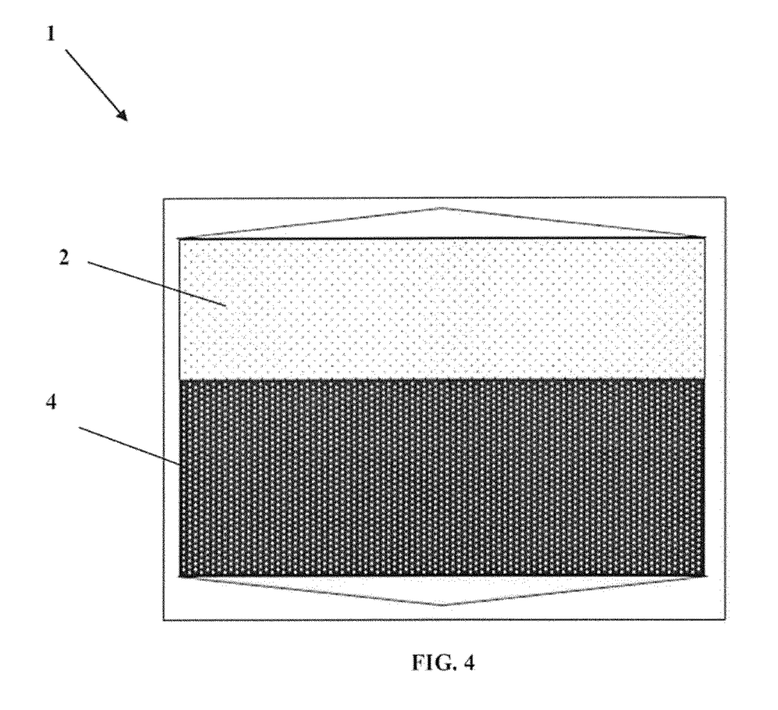
FIG. 4 is a cross-section of an exemplary filter cartridge incorporating the disclosed filter medium.

To achieve the removal of a broad spectrum of chemical hazards, multiple layers of impregnated activated carbon and nanocrystalline materials are incorporated into a adsorbent bed of a filter 1 (see FIG. 4). For optimum performance using the least amount of material, a two-layer configuration is provided. The top layer 2 includes a homogeneous mixture of an MgO/CaO based nanocrystalline material (Mg/Ca) and Kureha or other petroleum based activated carbon impregnated with phosphoric acid. The bottom layer 4 includes a single layer of Calgon URC carbon. The volume ratios of the components are 9:5:11 Mg/Ca, phosphoric acid on Kureha carbon, and URC, respectively.

The Mg/Ca is a physical mixture of magnesium and calcium oxides in a 1:1 ratio. The mixture was granulated with a 10% w/w sugar binder to increase the hardness of the granules. The Kureha carbon was modified with 5-20% w/w phosphoric acid by an incipient wetness impregnation and maintains a consistent particle size throughout.

Table 1 below identifies the specific activity of each layer toward the chemical agents. Initially, it would seem that any combination of these materials would make a successful adsorbent bed. However the opposite is true because of the reaction properties of the adsorbents. Mg/Ca is a strong desiccant and may remove a fraction of the water vapor from the air stream. Activated carbons require moisture to adsorb most analytes, and having the Mg/Ca as the top layer causes poor performance from the carbons. The exception to this is cyclohexane; it competes with water for binding sites on the carbon, so low humidity air will enhance cyclohexane removal.

TABLE 1

Reactivity of Adsorbents to Challenge Gases

| Challenge Gas | URC | Mg/Ca #15 | Phosphoric acid on Kureha carbon |
|---|---|---|---|
| Ammonia | S | N | Y |
| Cyanogen Chloride | Y | Y | |
| Cyclohexane | S | N | Y |
| Formaldehyde | Y | | |
| Hydrogen Cyanide | Y | Y | |
| Hydrogen Sulfide | Y | Y | |
| Nitrogen Dioxide | S | Y | D |
| Phosgene | Y | Y | |
| Phosphine | Y | N | |
| Sulfur Dioxide | S | Y | |

Y—good reactivity, S—somewhat reactive, N—no activity, D—detrimental

Another example of the importance of the layered configuration is nitrogen dioxide ($NO_2$). Activated carbons react with $NO_2$ to form nitric oxide (NO). The nanocrystalline Mg/Ca is capable of completely removing $NO_2$ from the air stream, but is unreactive toward NO. Putting either carbon before the Mg/Ca will cause the NO to break through the bed prematurely. One solution would be to put the Mg/Ca as the first layer, but having the Mg/Ca as an independent layer causes failure of the carbon by removing the water from the air stream. Therefore, a mixed layer of Mg/Ca and activated carbon is used. This allows the Mg/Ca to see $NO_2$ at the same time as the carbon. The reaction of $NO_2$ with Mg/Ca is favored over the reaction of $NO_2$ and carbon, so $NO_2$ is removed from the airstream before any NO can be formed. The mixture also allows more water to remain in the airstream, and therefore maintains the performance of the activated carbons.

The URC carbon should be a single layer for the removal of phosphine since it is the only species in the bed with activity toward this agent. Mixing of the URC with either the Kureha or Mg/Ca can create voids of non-reactivity and allow channeling of the gas through the adsorbent bed. A single moiety layer eliminates these voids and maintains desired performance.

Figure 5:
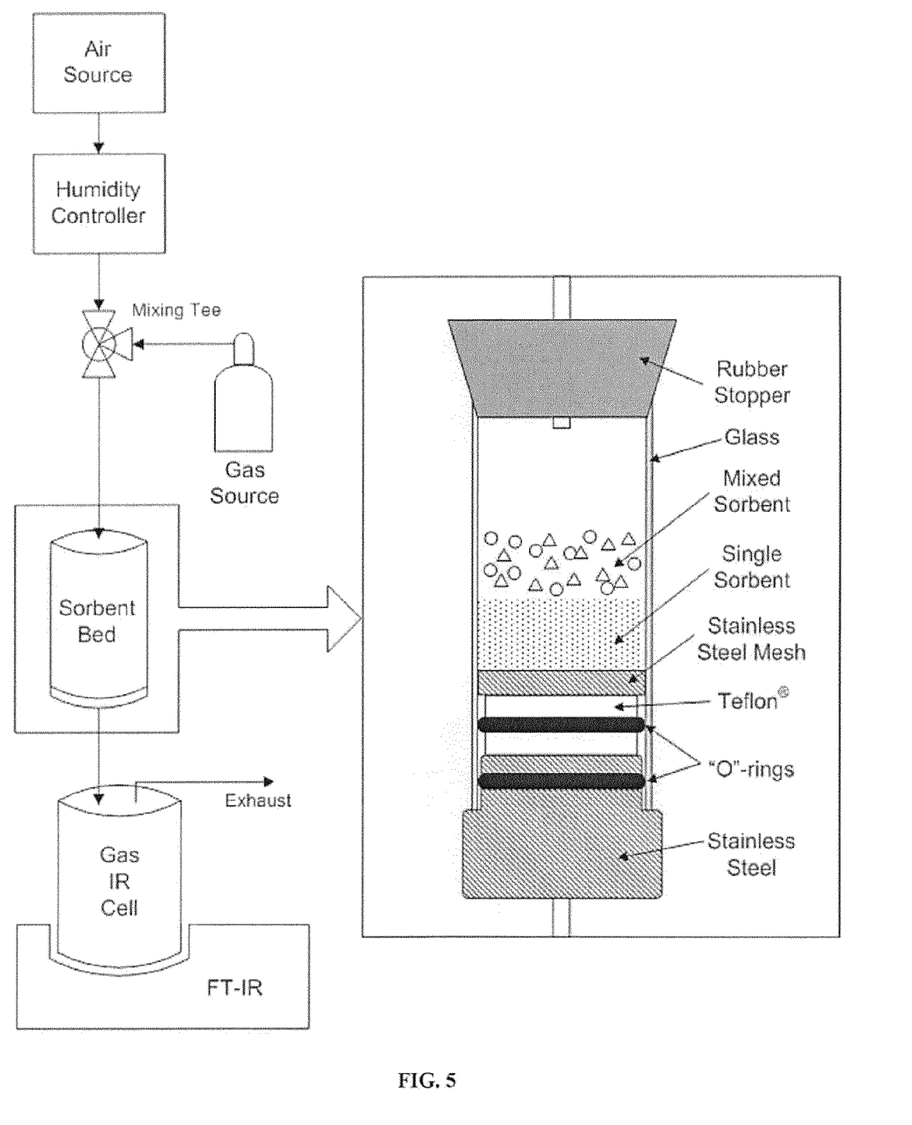
FIG. 5 is a schematic of a testing apparatus used to perform breakthrough testing.

FIG. 5 shows a schematic of an exemplary breakthrough testing apparatus. Breakthrough tests were carried out using a testing tube which had an internal diameter of 30 mm. During the tests, the tube was filled with granulated adsorbent (mesh size 20-50) to a bed thickness of 25 mm. The air containing the contaminant flowed downward, to prevent a fluidized bed effect, with a rate of 5.3 liters per minute. Humidity of air passing through the tested adsorbent was controlled by a MNR Miller-Nelson Research, Inc. mass flow controller using dry, compressed air and distilled water. Breakthrough tests were carried out at 25% and 80% relative humidity. Air composition downstream of the bed was analyzed either by electrochemical sensors from PureAire Monitoring Systems, Inc. (Lake Zurich, Ill., USA), or a Nicolet 6700 FT-IR from Thermo Scientific with a Variable Pathlength Long Path Gas Cell 16-V, from Infrared Analysis, Inc. (Anaheim, Calif., USA). The path length of the cell was adjusted to its maximum value of 16 m.

Figure 6:
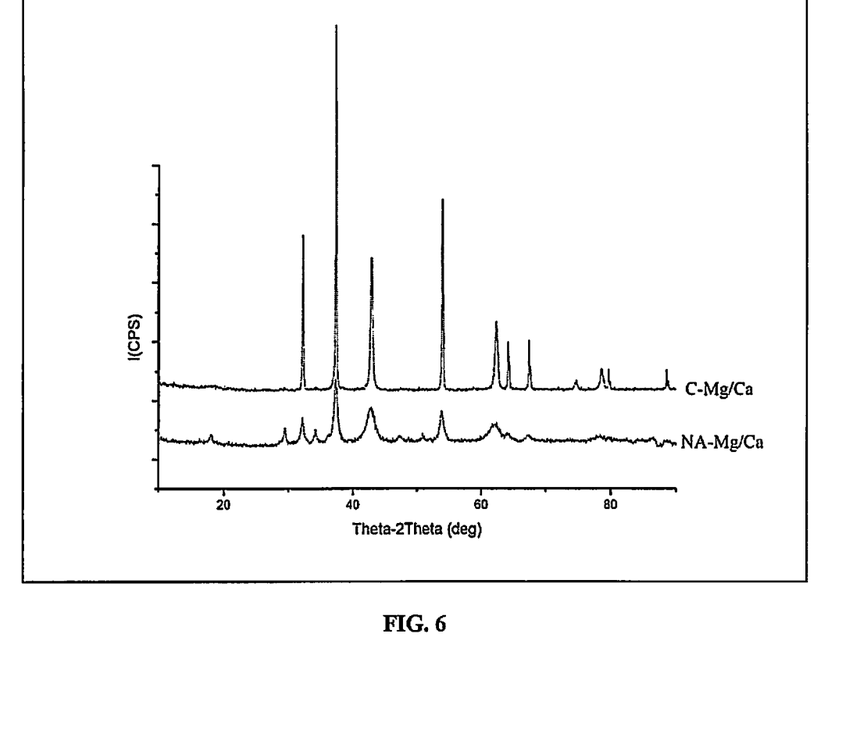
FIG. 6 is an X-ray Diffraction (XRD) spectra of commercial Mg/Ca (C—Mg/Ca an dNA-Mg/Ca)

Previous solutions have attempted to solve the problem of broad-spectrum air filtration in many ways, ranging from simply creating a deeper bed of activated carbon to using multi-layered adsorbent bed configurations. While previous commercial broad-spectrum adsorbent have shown high surface areas as well as having reactive impregnants, the configuration described in the present disclosure employs both high surface area impregnated carbon as well as nanocrystalline metal oxides. This nanocrystallinity leads to increased reactivity because of the large amount of corner and edge sites. X-ray Diffraction (XRD) patterns of these materials show broad peaks as compared to commercial mesoscale materials. Using Schemes equation, it is possible to calculate the crystallite size of a material based on the peak broadening observed by XRD. Fewer and broader peaks on MgO/CaO based nanocrystalline material (Mg/Ca) diffraction patterns indicate the amorphous nature of the NanoActive materials. FIG. 6 shows XRD spectra of commercial Mg/Ca (C—Mg/Ca) and (NA-Mg/Ca). The lack of long range order of the nanocrystalline structure means the crystallites are only a few nanometers in size. In the case of the NA-Mg/Ca material of FIG. 6, the crystallite size was calculated to be 10 nm.

Table 2 below identifies relevant adsorbent properties.

TABLE 2

Adsorbent Properties

| Adsorbent | SSA (m²/g) | Pore Size (Å) | Pore Volume (cm³/g) | Crystallite Size (nm) |
|---|---|---|---|---|
| URC | 703 | 36 | 0.18 | — |
| Mg/Ca | 196 | 54 | 0.27 | 5 (Mg), 13 (Ca) |
| C—Mg/Ca | 19 | 212 | 0.10 | 17 (Mg), 40 (Ca) |
| Kureha | 770 | 22 | 0.43 | — |

Surface areas and porosity was determined using a Quantachrome Nova 2200 BET instrument (Boynton Beach, Fla., USA). During the measurement, nitrogen gas was applied to the sample, which was immersed in a liquid nitrogen bath. The amount of nitrogen adsorbed was measured as a function of nitrogen pressure. The resulting adsorption isotherm was analyzed according to the Brunauer, Emmett, and Teller (BET) method. Chemical composition and crystallite size of metal oxide samples were determined using powder X-ray Diffraction (Kratos XDS-6000 Instrument, Manchester, U.K.). Using this technique, it is possible to determine if a powder is a pure metal oxide, a hydroxide, a carbonate, or a mixture of different forms. In addition, the crystallinity of the sample can be determined. To determine the crystallite size, the Scherrer equation was used:

$$\beta = \frac{K\lambda}{L\cos\theta}$$

where:
β is the "physical half-value width" (in degrees 2θ),
L is the crystallite size (dimension of the crystallite perpendicular to the diffracting net planes), K is a constant (often taken as 0.9), and
λ is the wavelength of the X-ray employed.

Materials prepared by NanoScale Corporation had crystallite sizes in the range 2-10 nm.

Figure 7:
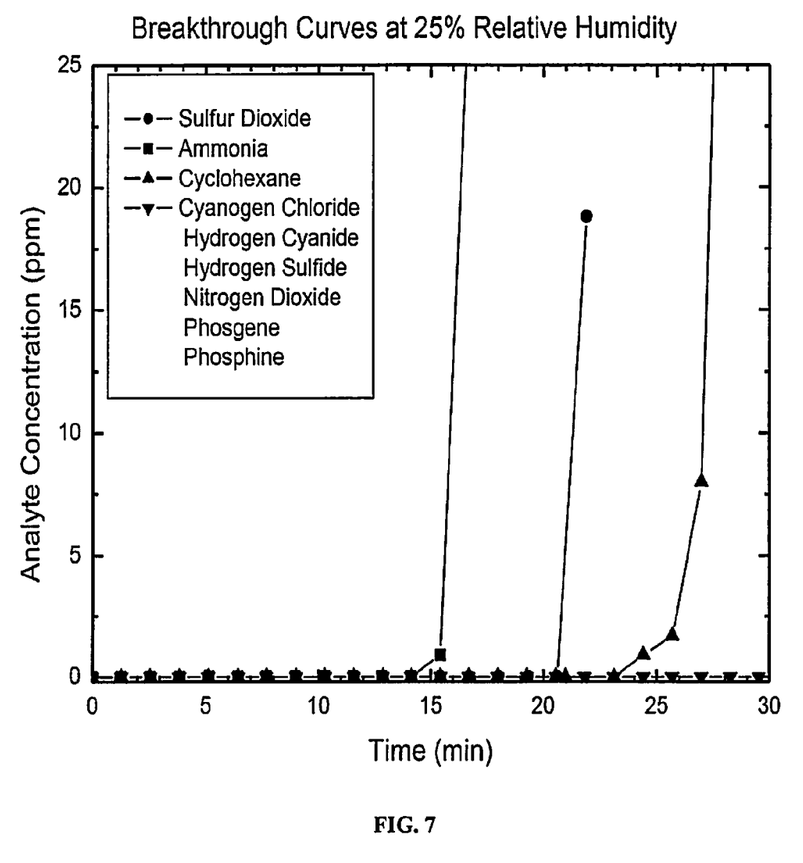
FIG. 7 is a graph of the breakthrough curves at 25% relative humidity and 64 liters/minute flow.
Figure 8:
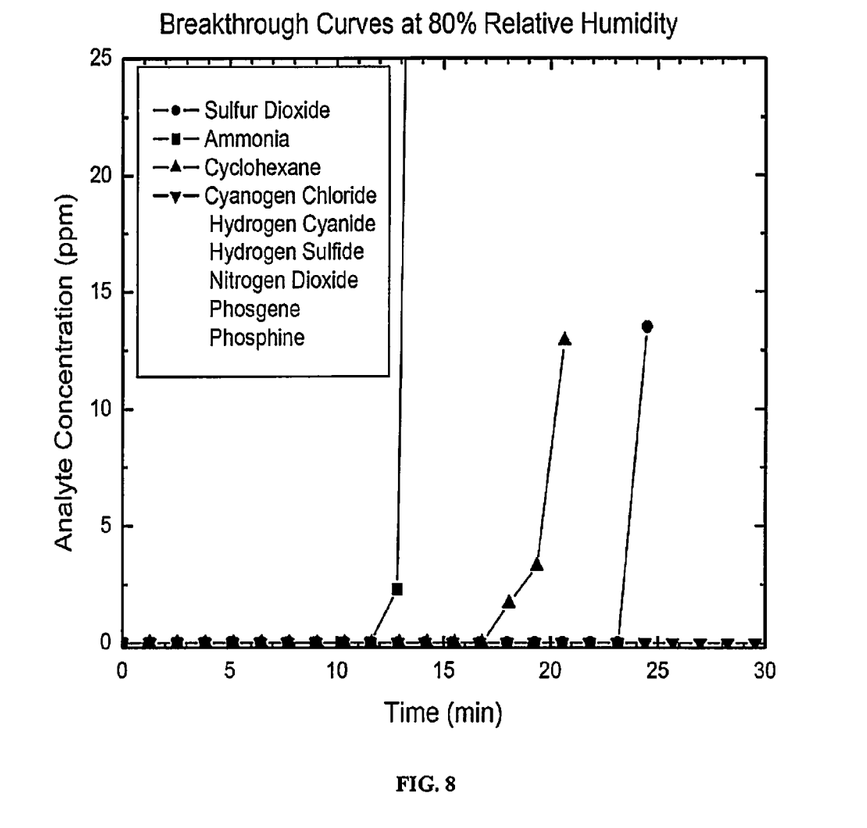
FIG. 8 is a graph of the breakthrough curves at 80% relative humidity and 64 liters/minute flow; and, FIG. 9 is a graph of the breakthrough curves at 50% relative humidity and 100 liters/minute flow.
Figure 9:
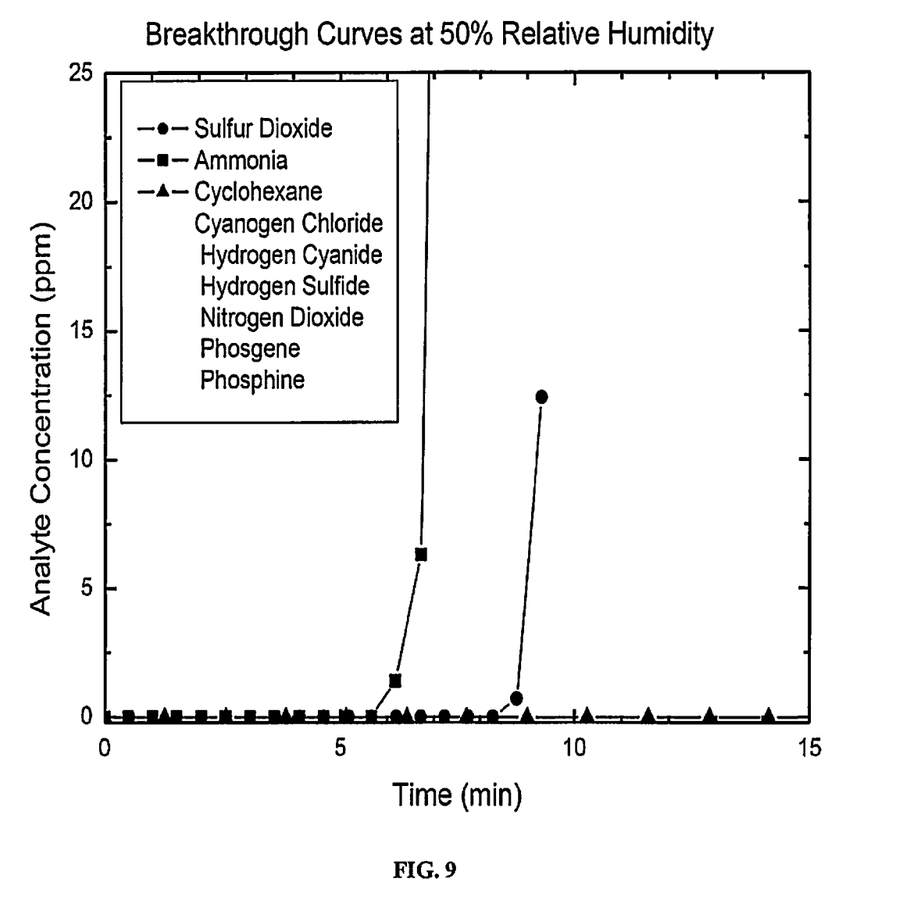

The disclosed multilayer mixed bed filter allows for a reduction in the size of the filter bed from 3.7 cm to 2.5 cm. In addition, the overall mass of the filter media can be reduced by 25%. The NIOSH CBRN CAP 1 breakthrough time required for 25% and 80% relative humidity at 64 lpm flow rate is 15 minutes and 5 minutes for 50% relative humidity and 100 lpm. Table 3 shows breakthrough results, while breakthrough curves are shown in FIGS. 7-9. Specifically, FIG. 7 shows breakthrough curves at 25% relative humidity and 64 lpm flow, FIG. 8 shows breakthrough curves at 80% relative humidity and 64 lpm flow, and FIG. 9 shows breakthrough curves at 50% relative humidity and 100 lpm flow.

Table 3 clearly shows that the reduced height bed meets the noted time requirements.

TABLE 3

Breakthrough results for layered adsorbent bed.

| Challenge Gas | Test Conc (ppm) | Breakthrough Conc (ppm) | 25% RH, 64 lpm | 80% RH, 64 lpm | 50% RH, 100 lpm |
|---|---|---|---|---|---|
| Ammonia | 2500 | 12.5 | 16.75 | 13-18 | 6.75 |
| Cyanogen Chloride | 300 | 2 | >30 | >30 | >15 |
| Cyclohexane | 2600 | 10 | 27 | 19.5 | >15 |
| Formaldehyde (AJE) | 500 | 1 | 35.5 | 16 | 12.5 |
| Hydrogen Cyanide | 940 | 4.7* | >30 | >30 | >15 |
| Hydrogen Sulfide | 1000 | 5.0 | >60 | >110 | >15 |
| Nitrogen Dioxide | 200 | 1 ppm NO₂ or 25 ppm NO** | >106 | >80 | >15 |
| Phosgene | 250 | 1.25 | >30 | >30 | >15 |
| Phosphine | 300 | 0.3 | >30 | >30 | >15 |
| Sulfur Dioxide | 1500 | 5 | 20.5 | 23 | 8.75 |

*Sum of HCN and $C_2N_2$.
**Measured for both. Breakthrough time is whichever reaches limit first.
11 mm URC (bottom layer), mixture of 9 mm Mg/Ca and Kureha (top layer)

URC-3319 (Calgon Carbon Corporation, Pittsburgh, Pa., USA) is a broad spectrum impregnated filter carbon (used as is). Kureha G-BAC carbon (Kureha America Inc., New York, N.Y., USA) is a petroleum pitch-based bead shaped, highly spherical activated carbon impregnated with phosphoric acid. NanoActive MgO/CaO is a high surface area, nanocrystalline magnesium oxide and calcium oxide synthesized by NanoScale Corporation.

It will be appreciated that the disclosed phosphoric acid treatment on Kureha carbon could be used on any high surface area activated carbon. Additionally, oxides of zinc, titanium, aluminum, cesium, iron, cerium, or copper could be incorporated into the metal oxide layer without changing the principles of the disclosed system.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A filter media, comprising:
 a first plurality of filter media particles comprising a high surface area substrate comprising at least one acidic impregnant;
 a second plurality of filter media particles comprising a high surface area substrate comprising at least one of magnesium oxide or calcium oxide; and,
 a third plurality of filter media particles comprising a high surface area substrate comprising an amine impregnant;
 wherein the filter media comprises first and second filter layers, the first and second plurality of filter media particles being intermixed and located in the first filter layer, the third plurality of filter media particles being located in the second filter layer.

2. The filter media of claim 1, wherein each of said substrates is essentially free of chromium.

3. The filter media of claim 1, wherein the acidic impregnant is phosphoric acid.

4. The filter media of claim 1, wherein the acidic impregnant has a maximum concentration of 10 percent.

5. The filter media of claim 1, wherein the high surface area substrate of the second plurality of filter media particles comprises an agglomeration of both magnesium oxide and calcium oxide.

6. The filter media of claim 1, wherein the at least one of magnesium oxide or calcium oxide comprises a nano-crystalline structure of about 20 nanometers or less per individual crystallite.

7. The filter media of claim 1, wherein the amine impregnant comprises a diamine.

8. The filter media of claim 7, wherein the diamine comprises an aliphatic linear carbon chain.

9. The filter media of claim 7, wherein the diamine has a molecular weight of about 100 or more.

10. The filter media of claim 1, wherein the amine impregnant comprises triethylenediamine (TEDA).

11. The filter media of claim 1, wherein the first plurality of filter media particles comprises phosphoric acid having a surface area of about 500 square meters per gram or more, the second plurality of filter media particles comprises an agglomeration of both magnesium oxide and calcium oxide having a surface area of about 100 square meters per gram or more, and the third plurality of filter media particles comprises triethylenediamine (TEDA) having a surface area of about 700 meters per gram or more.

12. The filter media of claim 11, wherein the phosphoric acid has a surface area of 770 square meters per gram or more and the agglomeration of both magnesium oxide and calcium oxide has a surface area of about 196 square meters per gram or more.

13. The filter media of claim 1, wherein the acidic impregnant is phosphoric acid and the amine impregnant comprises triethylenediamine (TEDA)

14. The filter media of claim 1, wherein the second plurality of filter media particles comprises a homogenous mixture of both magnesium oxide and calcium oxide in an approximate 1:1 ratio.

15. The filter media of claim 1, wherein the first layer is configured to receive a gas stream prior to the second layer in a direction of flow of the gas stream.

16. The filter media of claim 1, wherein the volume ratios of the first, second, and third plurality of filter media particles are approximately 5:9:11, respectively.

* * * * *